(No Model.) 2 Sheets—Sheet 2.

W. RYAN.
HUNTING DECOY.

No. 368,427. Patented Aug. 16, 1887.

Witnesses,
Geo. H. Strong.
J. H. Rouse.

Inventor,
Wm Ryan,
By Dewey & Co.
atty

UNITED STATES PATENT OFFICE.

WILLIAM RYAN, OF SAN FRANCISCO, CALIFORNIA.

HUNTING-DECOY.

SPECIFICATION forming part of Letters Patent No. 368,427, dated August 16, 1887.

Application filed May 19, 1887. Serial No. 238,798. (No model.)

*To all whom it may concern:*

Be it known that I, WILLIAM RYAN, of the city and county of San Francisco, State of California, have invented an Improvement in Hunting-Decoys; and I hereby declare the following to be a full, clear, and exact description of the same.

My invention relates to a novel hunter's decoy; and it consists of a series of adjustable floats with means for altering their size with relation to each other, so as to accommodate them to any-sized bird, a means for securing the bird thereon and supporting it in any position, and a device for anchoring the float and bird at any point.

Figure 1:
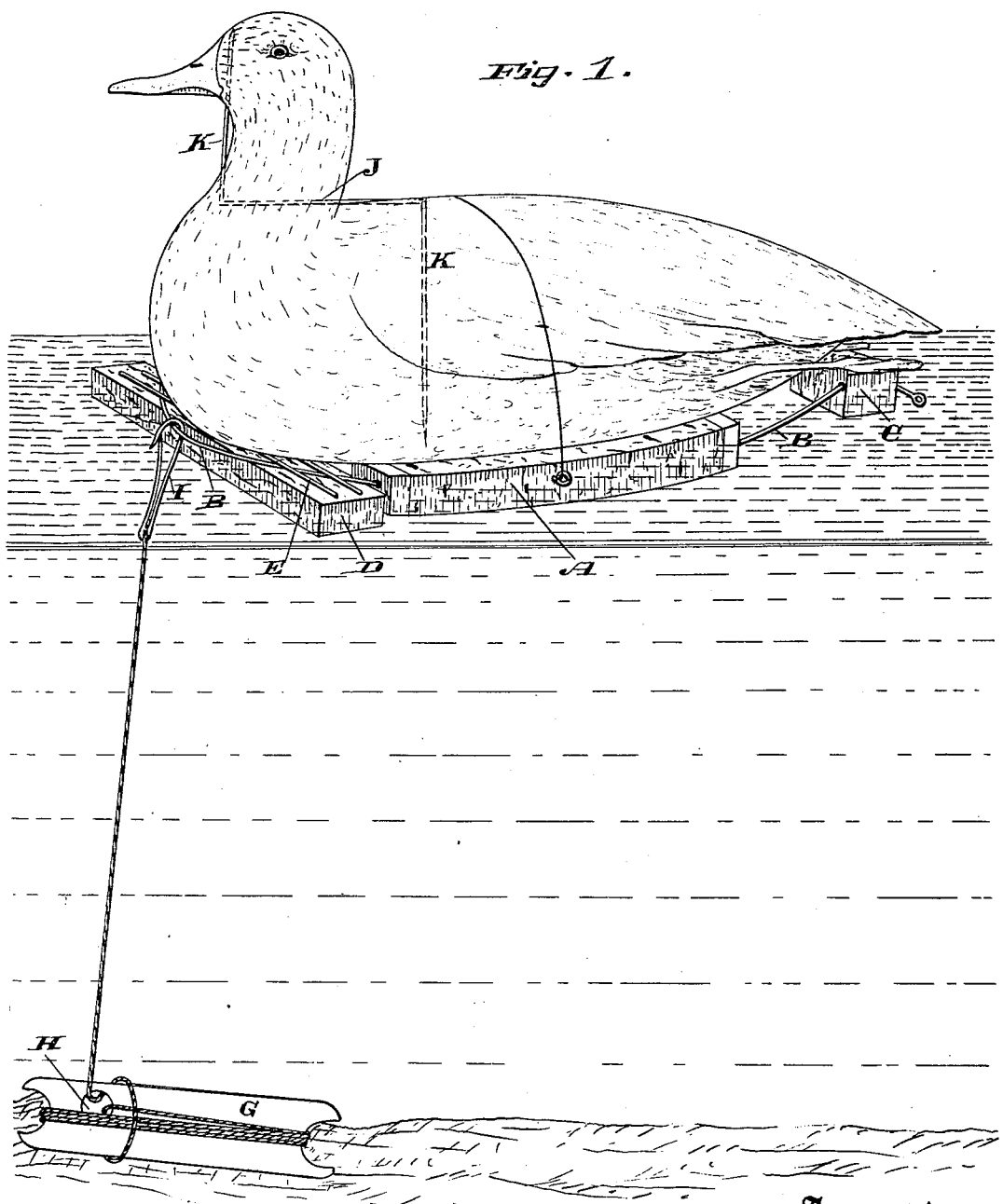
Figure 2:
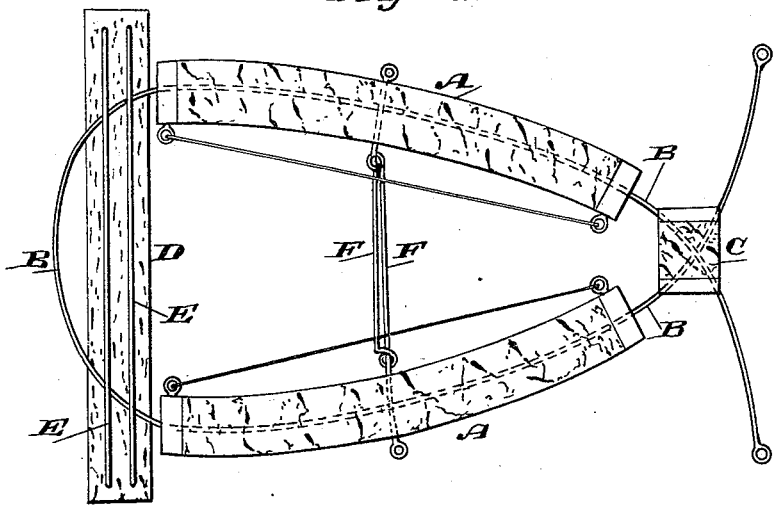
Figure 3:
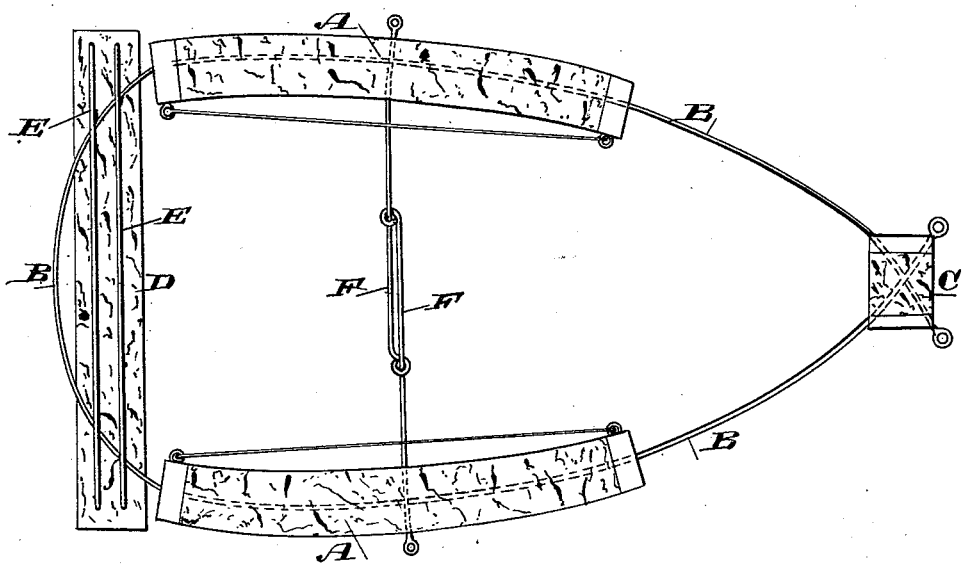

Referring to the accompanying drawings for a more complete explanation of my invention, Figure 1 is a view of my device showing the bird in position upon the float. Fig. 2 is a view of the float with the adjusting devices. Fig. 3 shows the float enlarged.

For hunters' use it is preferable to employ natural birds rather than artificial ones as decoys, and my device is intended to support a dead bird in such a position that it will appear natural as it rests upon the water.

A A are two side floats, which are made of cork or any other suitable buoyant material, and they are slightly curved, as shown, so as to conform to the outline of the bird to be supported. In the present case I have shown these floats having metallic caps upon each end and a hole bored through them centrally, through which a wire, B, passes, the two ends extending to the rear and crossing diagonally through a float, C, which stands transversely to the floats A and a short distance from them. The ends of the wire B may be drawn through this rear float, C, so as to bring it nearer to the rear ends of the floats A, and at the same time draw the two floats nearer together, making the device smaller, so as to support a very small duck.

When it is desired to enlarge the float, the small float C is drawn backward upon the wires B, these wires being at the same time pushed through the floats A, so that the latter are separated both at the front and rear.

D is another float, which extends transversely across the front and has wires E fitted to it so that they may be slipped over the curved front end of the wire B, and thus hold the float D firmly in position.

F F are two wires fixed on the inner sides of the floats A, and having links or loops where they unite or cross each other, so that they may slide upon each other and be made longer or shorter to accommodate the distance between the side floats.

Upon the outer sides of the floats A are fixed rings or hooks having an elastic strap attached to one, which may pass over the back of the duck placed upon the float and be attached to the hook upon the opposite side, thus holding the duck firmly in place.

The front float, D, may be shifted from one side to the other by sliding the wires E upon the front curve of the wire B, and this holds the bird up if it has become water-soaked upon one side or the other, or if the wind blows from one side.

In order to anchor the device I employ a sinker, G, which may be made of lead, galvanized metal, or other suitable heavy substance, and it is preferably notched or curved at the ends, so that the anchor-line may be wound upon it when not in use. A hole, H, is made through this sinker, so that in different depths of water the line may be wound up and the bight passed through this hole and looped around the sinker to shorten the line in case of shoal water. At the opposite end of the line is a safety-hook, I, which may be attached to the front curve of the wire B which unites the floats, and the sinker lying upon the bottom will hold the decoy in the proper place.

In order to hold the head of a dead bird up in a natural position, I employ a wire, J, having two bends, K, at right angles to each other, and an intermediate uniting portion, the ends being sharpened and the wire of such size as to have sufficient stiffness for the required purpose. One end of the wire is put down through the bird, being inserted through the backbone and passing down until its lower end strikes into the breast-bone. The horizontal portion of the wire then extends forward outside the bird among the feathers to a point upon the side of the neck. The head of the dead bird being lifted up, the upwardly-projecting point of the wire is inserted into the lower part and extends up to the top of the head, thus holding the head in a natural position. By means of this wire the bird may be held so as to sit naturally, either with the head forward or with the head turned back to represent a sleeping bird. The head portion of the wire is made shorter than the body portion. By this construction I provide a convenient float for decoys, and the different parts may be used independently, the bent wire serving to hold the duck in proper position, and it may be used without any float, and the anchoring device and sinkers may be used in connection with other decoys, if desired.

By the use of the sinker the lines may be wound up when the decoys are taken in, and thus prevented from becoming tangled. The safety-hook can be hooked into the duck if it is found not necessary to use the float.

Having thus described my invention, what I claim as new, and desire to secure by Letters Patent, is—

1. A supporting device for decoy-ducks, consisting of the side pieces, A, having a wire extending through them and adjustable so as to make the float narrower or wider, and adjustable front and rear pieces, substantially as described.

2. A supporting device for decoy-ducks, composed of the side pieces, an independent rear piece, having a wire passing through them, united at the front, with ends passing through the rear piece and capable of sliding through the parts, so as to draw them nearer together or separate them, and an adjustable front piece, substantially as herein described.

3. A supporting device for decoy-ducks, comprising the independent side, front, and rear pieces of the float, with the single uniting-wire passing through them, in combination with the transverse wire having the slide by which it may be shortened or lengthened, substantially as described.

4. A supporting device for decoy-ducks, comprising the independent side and rear portions of the float, having an adjusting-wire extending through them, in combination with the front float, with the transverse wires by which it is attached to the main adjusting-wire, and movable thereon, substantially as herein described.

5. A supporting device for decoy-ducks, comprising the float having the adjustable side, front, and rear pieces, in combination with the elastic band and the securing ends or hooks upon opposite sides of the float, whereby the bird may be held thereon, substantially as described.

6. A supporting device for a decoy-duck, consisting of a longitudinally and laterally adjustable float and a wire having a central portion horizontal, the two ends bent at right angles with this portion and in opposite directions, and sharpened, so that one end passes down through the body of the bird into the breast, while the other extends upward through the head to support the bird in a natural position, substantially as herein described.

7. A supporting device for decoy-ducks, comprising the longitudinally and laterally adjustable float-sections and the metallic sinker having the notched ends and a hole made transversely through it, in combination with the cord wound upon the sinker and having its length adjusted by means of the hole through which the bight of the cord may be passed and looped around the sinker, and a safety-hook at the opposite end of the cord, whereby the float or decoy may be anchored.

In witness whereof I have set my hand.

WILLIAM RYAN.

Witnesses:
S. H. NOURSE,
H. C. LEE.